(No Model.)
G. W. MALLETTE.
VELOCIPEDE.
No. 369,864. Patented Sept. 13, 1887.
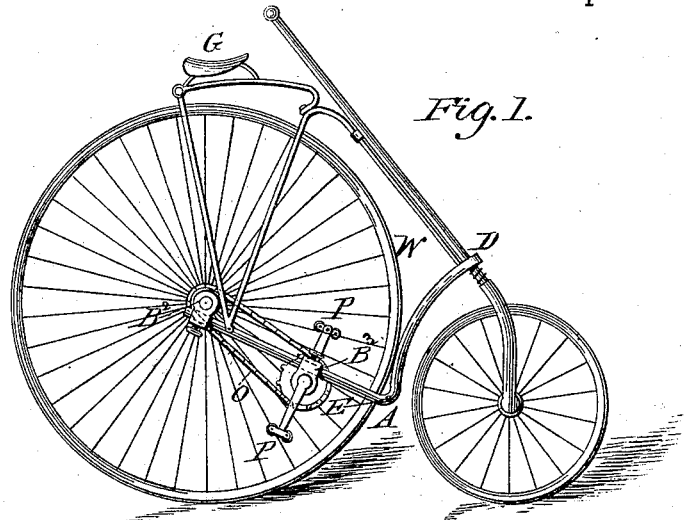
Fig. 1.
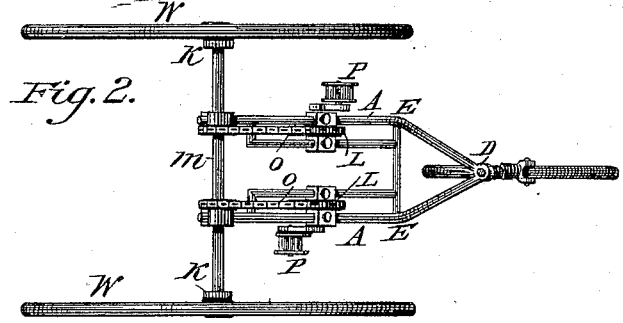
Fig. 2.
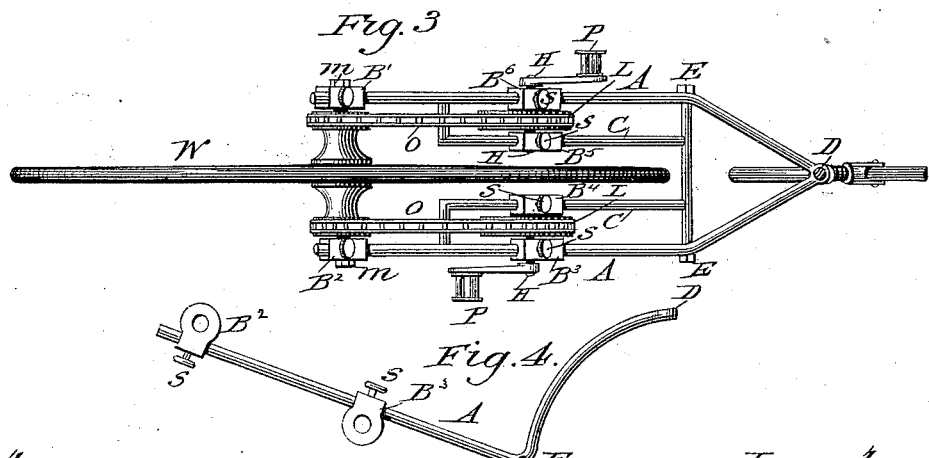
Fig. 3.
Fig. 4.
Witnesses.
Jos. H. Appleton
Edward Disbrow
Inventor:
George W. Mallette

United States Patent Office.

GEORGE WHITFIELD MALLETTE, OF TRENTON, NEW JERSEY.

VELOCIPEDE.

SPECIFICATION forming part of Letters Patent No. 369,864, dated September 13, 1887.

Application filed January 24, 1887. Serial No. 225,595. (No model.)

*To all whom it may concern:*

Be it known that I, GEORGE WHITFIELD MALLETTE, a citizen of the United States, residing at Trenton, in the county of Mercer and State of New Jersey, have invented an Improvement in Velocipedes, of which the following is a specification.

My invention relates to machines or apparatus used for traveling, the object of the invention being to provide a safe and inexpensive machine which may be easily adjusted and work quickly and effectively; also to combine in one machine the tricycle and bicycle, so that it can be used as either. I attain the object in the following way by constructing an angular frame to connect the shaft of the driving wheel or wheels with the rod to which the guide-wheel is attached. The frame carries the pedal-shafts and rests on a spring at the forward end, thus giving the pedals ease when in motion.

The invention consists, also, of movable journals adjustable to any part of the frame, that can be placed either side up and fastened in place by means of set-screws, so as to make the distance greater or less from the seat to the pedals, making the machine adjustable to different-sized persons. There is a ratchet applied to the hub of each of the large wheels, thus making both large wheels to drive when the shaft is revolved.

To change the tricycle to a bicycle, substitute a short shaft for the long one, and place one large wheel in the center of the frame, connecting the parts the same as in the tricycle, as is hereinafter fully described and claimed.

Reference is to be had to the accompanying drawings, forming a part of this specification, in which similar letters of reference indicate corresponding parts in all the figures.

Figure 1 is a side view of the machine. Fig. 2 is a top view of the machine as a tricycle without the seat. Fig. 3 shows the machine as a bicycle drawn on a larger scale. Fig. 4 is a side view of the frame with the journals attached.

The letter A indicates the frame, which consists of a bar of metal bent at the center, leaving a small circular opening at D. From this opening the bar will be spread at an angle to the point E. Then the sides will run parallel to the ends which are at or near the journals holding the main shaft $m$, as shown in Figs. 1 and 4. The frame is also bent at an angle upward from the point E, so as to lower the journals of the pedal-shafts H H.

On the inside of the frame A is bolted a piece of metal, C. The same is a part of the frame to hold the journals of the pedal-shafts on the inside. There are six journals, $B'$ $B^2$ $B^3$ $B^4$ $B^5$ $B^6$, connected with the frame. They are made with an opening to fit the frame, and can be fastened at any point desired by means of set-screws $s$ $s$, thus making the machine adjustable to different-sized persons.

K K in Fig. 2 show a ratchet applied to the hub of each of the large wheels W W, thus forcing both the wheels W W to drive when the shaft is revolved.

The machine is put in motion by the operator stepping on the pedals P P, which are fastened to the shafts H H, and rotating the shafts.

L L are sprocket-wheels fastened to the shafts H H, over which a linked belt, O O, passes to sprocket-wheels on the main shaft $m$, to which the large wheels W W are held by collars on the ends of shaft. When three wheels are connected together, as I have shown, they form a tricycle in which both of the large wheels W W assist in driving, as shown in Fig. 2.

When two wheels are connected as shown in Figs. 1 and 3, they form a bicycle with a rotary pedal having the driving-wheel in rear of the pedals, thus making a safe bicycle, as the guide-wheel is so far in front of the operator that it cannot throw him off by tipping forward, and the pedals are so near the ground that the operator can step off without upsetting the machine.

Having thus described my invention, I claim as new and desire to secure by Letters Patent—

1. The combination, in velocipedes, of a narrow frame, A, carrying adjustable journals $B'$ $B^2$ $B^3$ $B^4$ $B^5$ $B^6$, and two crank-shafts, H H, whereby the machine is adjustable from a tricycle to a bicycle, substantially as shown and described.

2. The combination, with the frame A, of the adjustable journals $B'$ $B^2$ $B^3$ $B^4$ $B^5$ $B^6$, whereby each shaft revolving therein is independently adjustable, substantially as shown.

GEORGE WHITFIELD MALLETTE.

Witnesses:
JOS. H. APPLETON,
EDWARD DISBROW.